K. SHOTOVSKY.
AEROCYCLE.
APPLICATION FILED NOV. 16, 1916.
1,220,368.
Patented Mar. 27, 1917.
3 SHEETS—SHEET 1.
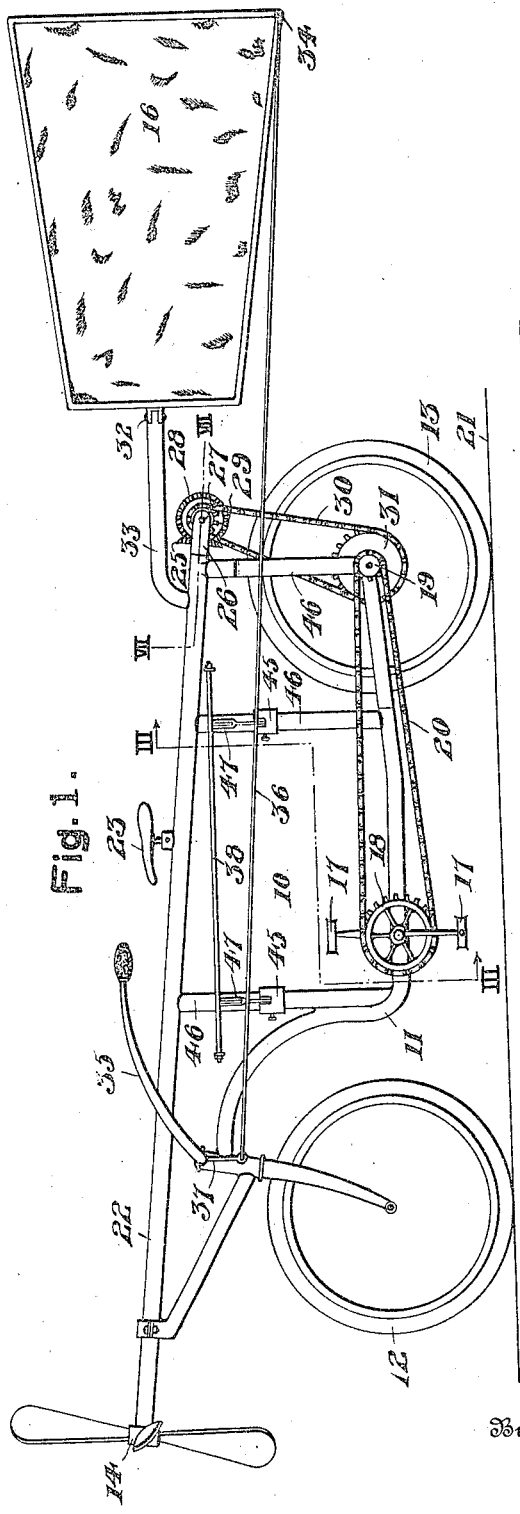
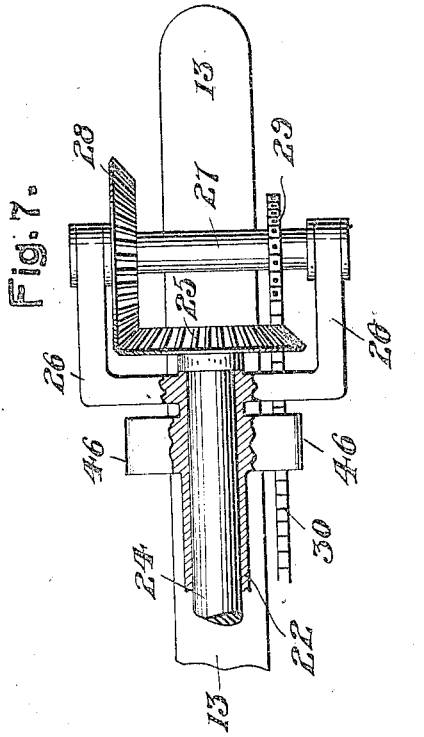
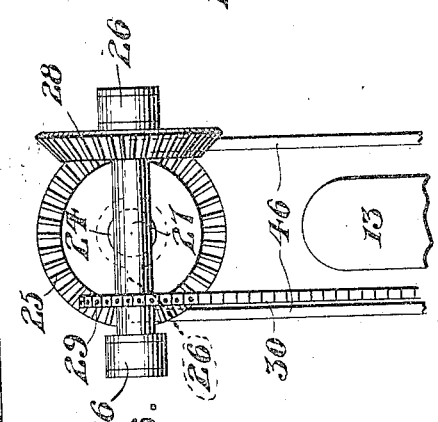
Inventor
K. Shotovsky
By
Attorney K. SHOTOVSKY.
AEROCYCLE.
APPLICATION FILED NOV. 16, 1916.
1,220,368.
Patented Mar. 27, 1917.
3 SHEETS—SHEET 2.
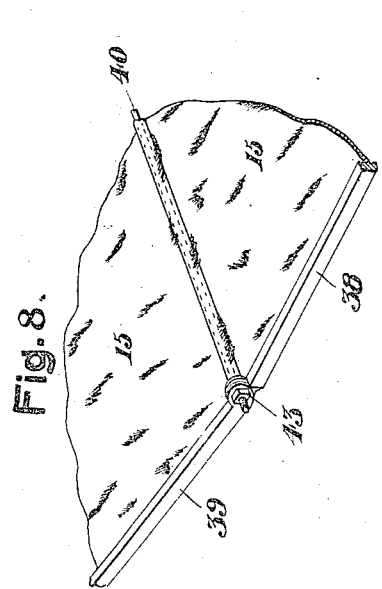
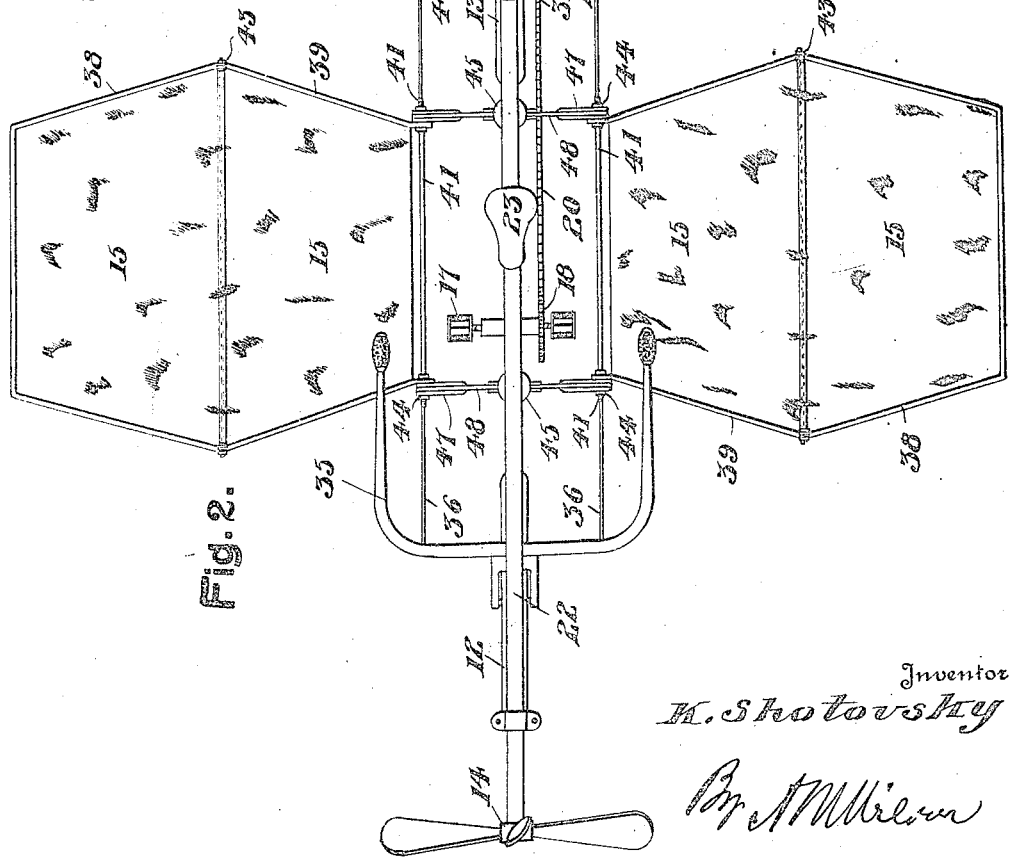
Inventor
K. Shotovsky
Attorney

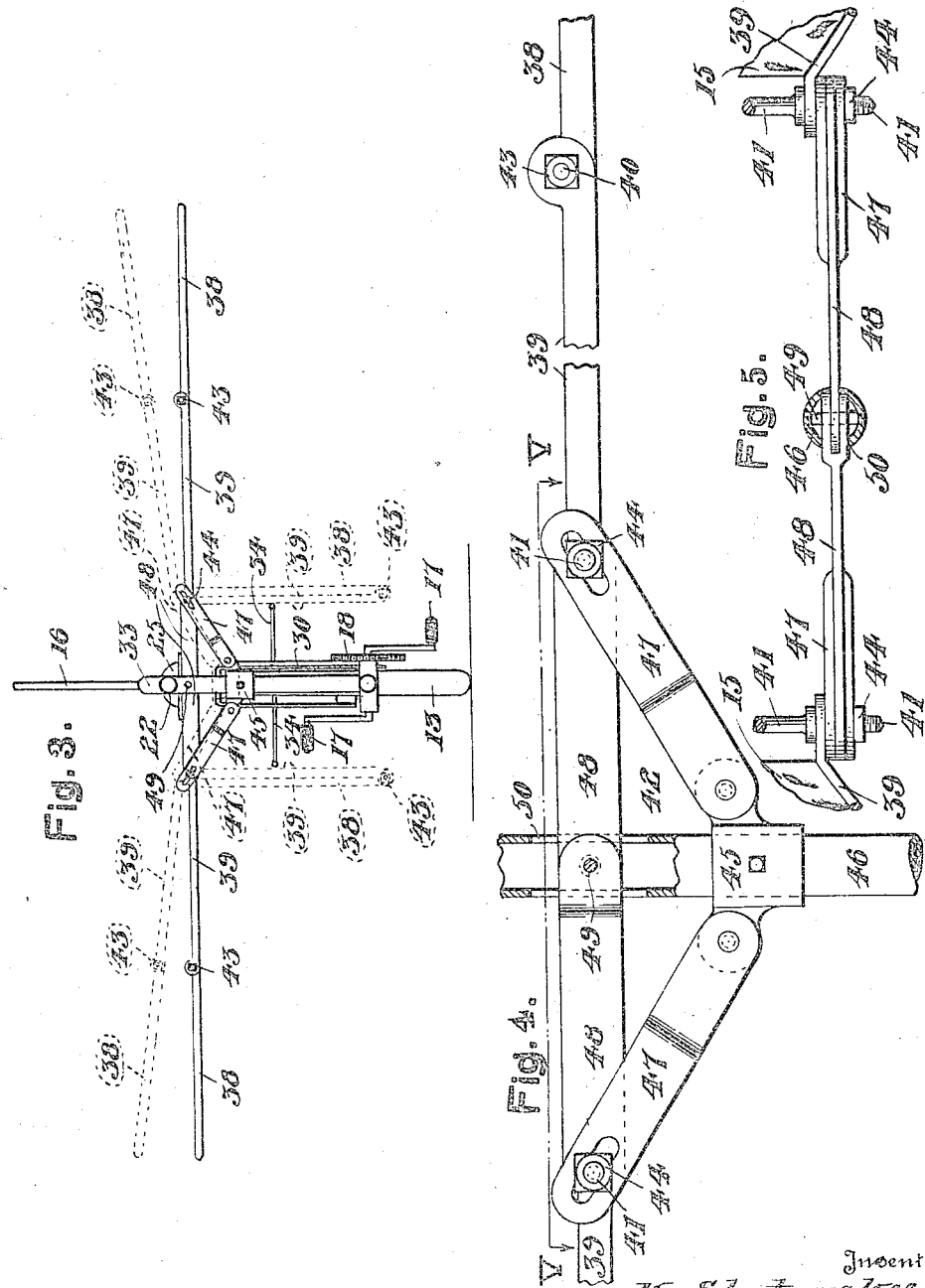

UNITED STATES PATENT OFFICE.

KAROL SHOTOVSKY, OF CLEVELAND, OHIO.

AEROCYCLE.

1,220,368.  Specification of Letters Patent.  Patented Mar. 27, 1917.

Application filed November 16, 1916. Serial No. 131,733.

*To all whom it may concern:*

Be it known that I, KAROL SHOTOVSKY, a subject of the King of Hungary, residing at Cleveland, in the county of Cuyahoga and State of Ohio, have invented certain new and useful Improvements in Aerocycles, of which the following is a specification.

This invention relates to certain new and useful improvements in aero-cycles.

The primary object of this invention is the provision of a flying machine in the form of a bicycle, adapted for traveling through the air by bicycle mechanism actuated by the driver.

A further object of the device is the provision of a bicycle provided with an air propeller and elevating means operable during the forward movement of the device, steering means being arranged for direct intercourse either through the air or upon the land.

A still further object of the invention is the provision of a bicycle having a traction wheel drive and also an air propeller simultaneously operated therewith, lateral planes being arranged whereby the machine will have little or no frictional contact with the ground during the rapid traveling thereof.

In the drawings forming a part of this application and in which like-reference characters refer to corresponding parts, throughout the several views, Figure 1 is a side elevation of the device, Fig. 2 is a top plan view thereof, Fig. 3 is a transverse sectional view taken upon line III—III of Fig. 1, Fig. 4 is an enlarged elevational view showing the adjustable mounting members for the side plane, Fig. 5 is a sectional view taken upon line V—V of Fig. 4, Fig. 6 is an enlarged top plan view of the rear portion of the device.

Fig. 7 is an enlarged sectional view taken upon line VII—VII of Fig. 1.

Fig. 8 is a perspective view of a central side portion of one of the planes, and Fig. 9 is a top plan view of a portion thereof partially broken away.

Referring more in detail to the drawing the device practically consists of a bicycle 10, having a frame 11 provided with a front-steering wheel 12 and rear traction wheel 13, combined with which there is forwardly arranged a propeller 14 operated simultaneously with the rear wheel 13, side planes or wings 15, and a rearwardly disposed steering plane or rudder 16, mounted upon the said frame.

The bicycle 10 has the usual pedal operating means 17 comprising a forward sprocket wheel 18 and a rear sprocket wheel 19, over which a chain 20 passes in the usual manner for revolving the traction wheel 13 for moving the bicycle along the ground 21.

A centrally arranged tubular casing 22 is carried upon the frame 11, having a saddle 23 for the rider mounted thereon, while a shaft 24 journaled through the casing 22 has the aforementioned propeller 14 secured to its forward end, while a gear 25 is secured to the rear end thereof. A fork 26 is carried by the rear end of the casing 22 for journaling a stud-axle 27, upon which axle a gear 28 is secured in constant mesh with the aforementioned gear 25, a sprocket wheel 29 is carried by the axle 27, over which a sprocket chain 30 passes to a relatively larger sprocket 31 secured to the rear wheel 13. By this arrangement it will be understood that the operator positioned upon the seat 23 may propel the bicycle 10 forwardly in the usual manner by operating the pedals 17, while simultaneously therewith the shaft 24 and propeller 14 will be revolved in assisting the forward travel of the device.

The aforementioned steering plane or rudder 16 is pivoted as at 32 to a rear extension 33 of the casing 22, a cross bar 34 arranged at the rear end of the rudder 22 being operatively connected to the handle bars 35 of the bicycle by means of rods 36 arranged at opposite sides thereof, with their forward ends pivotally attached to depending arms 37 carried by the said handle bars 35. The handle bars 35 are turned by the operator for moving the wheel 12 in the usual steering operation of the bicycle, while the rudder 16 is correspondingly moved assisting in maintaining the equilibrium of the bicycle when moving upon the ground and for directing its course when traveling through the air.

The members 15 act as side wings and sustaining planes for the device, each of the same consists of a bow-shaped frame 38 at its free end having opposite rails 39 hinged thereto by a central pintle 40, the rails 39 being secured by bolts 41 with brackets 42 of the frame 11, a lock nut 43 is carried on the pintle 40 around the portion of the wings to be folded together and retained in that position when desired, as illustrated by dotted lines in Fig. 3. Lock nuts 44 being also carried by the pivot members 41, the wings 15 may be adjusted at the desired inclination for use and then retained by the said nuts 43 and 44. The brackets 42 consist of collars 45 adjustably arranged upon upright posts 46 of the frame 11, the lugs 47 being pivoted to the collars 45 and having slotted engagement with the pivot members 41, which members are attached to the opposite ends of a double link 48, portions of which are centrally pivoted together as at 49 within the vertical slots 50 in the said posts 46.

A device is arranged light in weight and readily operatable by means of which rapid travel can be effected upon the ground, the device being serviceable as a guider for skimming over the surface of the ground and rising short distances above, readily operatable steering means being arranged for directing the course of travel.

What I claim as new is:—

1. A device of the class described comprising a bicycle, upright posts arranged thereon, a longitudinally arranged casing carried by the said posts, a shaft journaled through the said casing, an air propeller fixed to the forward ends of the said shaft, operative connections between the said shafts and the rear wheel of the bicycle, a seat arranged upon the said casing, oppositely positioned foldable wings adjustably carried by the said posts, and a rudder rearwardly carried by the said casing, having operative connections with the handle bars of the bicycle.

2. A glider comprising a bicycle having a frame, upright posts carried by the said frame, a tubular casing upon the said posts longitudinally of the bicycle, a fork at the rear end of the said casing, a shaft journaled through the said casing, a propeller upon the forward end of the said shaft forwardly of the bicycle, a gear upon the rear end of said shaft within the said fork, an axle journaled into said fork, a gear upon the said axle in constant mesh with the gear of the said shaft, and sprocket wheel and chain connections between the said axle and the driving wheel of the bicycle.

3. A glider comprising a bicycle having a frame, upright posts carried by the said frame, a propeller shaft casing upon the frame, a rearwardly arranged rudder pivotedly mounted upon the said casing, depending arms carried by the handle bars of the bicycle, connections between the said arms and the said rudder, adjustable brackets mounted upon the said posts, and foldable planes adjustably carried by the said brackets.

In testimony whereof I affix my signature.

KAROL SHOTOVSKY.